US012560457B2

(12) United States Patent
    Leroy

(10) Patent No.:    US 12,560,457 B2
(45) Date of Patent:        Feb. 24, 2026

(54) MEASUREMENT DEVICE COMPRISING A SYSTEM FOR MECHANICALLY UNCOUPLING A HALL EFFECT SENSOR

(71) Applicant: COMPAGNIE GENERALE DES ETABLISSEMENTS MICHELIN, Clermont-Ferrand (FR)

(72) Inventor: Vianney Leroy, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 201 days.

(21) Appl. No.: 18/266,397

(22) PCT Filed: Nov. 26, 2021

(86) PCT No.: PCT/FR2021/052097
    § 371 (c)(1),
    (2) Date: Jun. 9, 2023

(87) PCT Pub. No.: WO2022/123137
    PCT Pub. Date: Jun. 16, 2022

(65) Prior Publication Data
    US 2024/0102829 A1      Mar. 28, 2024

(30) Foreign Application Priority Data
    Dec. 10, 2020    (FR) ...................................... 2012958

(51) Int. Cl.
    G01D 5/14          (2006.01)
    G01B 7/02          (2006.01)
    (Continued)

(52) U.S. Cl.
    CPC ............. G01D 5/145 (2013.01); G01B 7/023 (2013.01); G01B 7/14 (2013.01); G01B 7/26 (2013.01)

(58) Field of Classification Search
    CPC .. G01D 5/145; G01D 5/14–185; G01D 3/028; G01B 7/10; G01B 7/107;
    (Continued)

(56) References Cited

U.S. PATENT DOCUMENTS 4,340,877  A      7/1982  Herden
    10,113,855 B2    10/2018  Ledoux et al.
    (Continued)

FOREIGN PATENT DOCUMENTS

FR          3007517 A1    12/2014
    FR          3079568 A1    10/2019
    (Continued)

OTHER PUBLICATIONS

International Search Report dated Mar. 3, 2022, in corresponding PCT/FR2021/052097 (6 pages).

*Primary Examiner* — Lee E Rodak
*Assistant Examiner* — Jeremiah J Barron
(74) *Attorney, Agent, or Firm* — VENABLE LLP

(57) ABSTRACT

A device for measuring the distance between two substantially parallel surfaces of an object comprises an electronic apparatus with a Hall effect sensor. The device comprises a mechanical decoupling system which isolates the object to be measured from the measuring apparatus so as to eliminate interactions that can disrupt the measurement. This device can be applied to the measurement of the thickness of a layer of rubber for a tire, and more particularly to the measurement of the remaining thickness of a tread.

8 Claims, 5 Drawing Sheets

(51) Int. Cl.
    *G01B 7/14*        (2006.01)
    *G01B 7/26*        (2006.01)

(58) Field of Classification Search
    CPC ....... G01B 7/023; G01B 7/14; G01M 5/0091;
                 B60C 11/246; B60C 11/243; B60C
                 2019/005; B60C 2019/004; B60C
          2011/0341; G01R 33/091; G01R 33/0011;
           G01R 33/0005; G01R 33/025; G01R
                                   33/072
    See application file for complete search history.

(56)                   References Cited

U.S. PATENT DOCUMENTS

| | | | |
|---|---|---|---|
| 11,703,422 B2 | 7/2023 | Leroy et al. | |
| 2014/0320115 A1* | 10/2014 | Mase et al. | G01R 33/02 |
| 2016/0153763 A1 | 6/2016 | Ledoux et al. | |
| 2016/0161243 A1* | 6/2016 | Ledoux et al. | G01B 7/26 |
| 2017/0363444 A1* | 12/2017 | Kawamura et al. | G01D 5/14 |
| 2021/0025783 A1 | 1/2021 | Leroy et al. | |
| 2021/0088601 A1 | 3/2021 | Harder et al. | |

FOREIGN PATENT DOCUMENTS

| | | | |
|---|---|---|---|
| WO | 2006/106454 A1 | 10/2006 | |
| WO | 2014/202747 A1 | 12/2014 | |
| WO | WO-2021055712 A1 * | 3/2021 | G01B 7/023 |

* cited by examiner

MEASUREMENT DEVICE COMPRISING A SYSTEM FOR MECHANICALLY UNCOUPLING A HALL EFFECT SENSOR

FIELD OF THE INVENTION

The present invention relates to a device for measuring the distance between two substantially parallel surfaces of an object, the said device comprising an electronic apparatus including a Hall effect sensor. The said device also comprises a mechanical decoupling system which isolates the object to be measured from the measuring apparatus so as to eliminate interactions that can disrupt the measurement.

PRIOR ART

Document WO 2014202747 describes a system for measuring the thickness of a layer of rubbery material of a tyre. It takes the form of a unit to be attached to the ground. In use, this type of unit is subject to high stresses on account of numerous vehicles of all types, including heavy-duty vehicles, driving over it. Despite these significant stresses, the unit must not move or lift. The units are therefore often attached to the ground by means of significant infrastructure in the ground. This infrastructure involves major work, which is both time-consuming and costly. Moreover, if a housing proves to be badly positioned, any repositioning also requires major work, involving heavy equipment. There is therefore a need to make it possible to easily fasten and reposition the measurement units, with simplified implementation.

The document FR3007517 describes a system for measuring the thickness of a layer of rubber for a tyre. This system uses a static magnetic field source and an element for measuring the magnetic field. Such a system is intended to be installed in a unit over which the vehicles drive. The measurements are made when the wheels pass over the unit. The unit must be able to withstand significant loads. The load stresses are linked to the number of vehicles driving over the unit, and to their weight. Furthermore, malfunctioning of the various electronic elements can be caused in particular by vibrations while the vehicles drive over.

To overcome these various drawbacks, the document FR3079568B1 proposes a fastening system for fastening an electronic device, for example a magnetic sensor, in a measurement unit, for example for measurement of tyre characteristics, which allows the constituent elements to be assembled without play or the risk of vibration. However, in use, this assembly is extremely sensitive to deformations and movements during the measurement. This is because the measurement is made over a range of approximately 2800 millivolts (mV), and the sensor has a drift of 5 mV per micrometre (um) of relative movement of the magnet in relation to the Hall effect component of the printed circuit board. This assembly must be located at least 4 mm from the measurement surface of the mechanical body of the sensor, in direct contact with the tyres of the vehicles analysed when running fully laden. In this context, it was difficult to fully isolate (<1 um) the sensor assembly from deformations caused by a vehicle driving over.

The inventors have set themselves the objective of improving the above device in order to isolate the electronic apparatus of the object to be measured so as to eliminate interactions that can disrupt the measurement.

SUMMARY OF THE INVENTION

This objective has been achieved by a device for measuring the distance between two substantially parallel surfaces of an object, the said device comprising:

A hermetic measurement cell having at least one flat surface, forming a measurement surface, the said measurement cell having a measuring apparatus including a permanent magnetic field source, an electronic circuit equipped with a Hall effect sensor, the output signal of which depends on the magnetic field generated;

The said at least one flat surface of the measurement cell being intended to come into contact with a flat surface of the object;

The second surface of the said object, which is substantially parallel to the first surface of the said object, comprising a composition based on ferromagnetic materials;

A variation in the magnetic field being generated when the object is resting on the measurement cell.

This device is characterized in that it comprises a sealed cavity filled with a volume of air, formed between the measuring apparatus and the measurement surface of the cell.

The principle of the invention is inspired by the Hall effect for measuring the distance between two substantially parallel surfaces of an object, one of the two surfaces comprising a composition based on ferromagnetic materials. The permanent magnetic source of the measuring device magnetizes that surface of the object that is provided with a composition based on ferromagnetic materials. The magnetic field that emanates from it acts on the electronic circuit of the apparatus of the measurement cell to generate a signal at the output of the Hall effect sensor that relates to the distance to be measured.

The main feature of the invention is the formation of a sealed layer of air in the cavity of the measurement cell in the immediate vicinity of the measurement surface. This sealed layer of air has the property of mechanically isolating the measuring apparatus from the measurement surface where the object rests.

Advantageously, the sealed cavity is delimited by the inner surface of the measurement cell, and by a sealing part, which has a profile that is homothetic to that of the measurement cell in its upper section located below the measurement surface, and the said sealing part, in its lower section adjacent to the measurement surface, is equipped with an attachment system which is sealed in relation to the measurement cell.

According to one embodiment of the invention, the device comprises a fastening guide that exerts a force to hold the measuring apparatus against the sealing part in its central portion closest to the measurement surface.

According to a preferred embodiment, the lower section of the sealing part is embedded in a resin.

The embodiment above leads to a measurement cell which has the advantage of not being made up of metal components which could disrupt the measurement. This embodiment is easily accessible for a low industrial cost. The encapsulation of the electronic apparatus in resin makes it possible to obtain an even longer service life of the measurement cell.

Further embodiments of the invention are linked to the choice of the permanent magnetic field source, which may be made up of at least one coil supplied with a direct electrical current, or else made up of a plurality of permanent magnets disposed in a line.

The measuring device of the invention has numerous applications. To that end, the measurement cell may be inserted inside a measurement unit which is not electrically conductive and the materials of which have a magnetic susceptibility which is zero or low enough to be similar to air or a vacuum.

Advantageously, the device comprises a plurality of aligned measurement cells installed in a measurement unit so as to interact to measure the distance between the two substantially parallel surfaces at multiple measurement points.

In this configuration, the measurement unit is disposed on or embedded in a ground which is driven over. This will be the case when this device is applied to the measurement of the thickness of rubbery material remaining on the tread of a tyre.

As is known, the tread of a tyre, regardless of whether it is intended to be fitted on a passenger vehicle or a heavy-duty vehicle, is provided with a tread pattern comprising, notably, tread pattern elements or elementary blocks delimited by various main, longitudinal, transverse or oblique grooves, the elementary blocks also being able to have various finer slits or sipes. The grooves form channels intended to discharge the water during running on wet ground, and define the leading edges of the tread pattern elements.

The depth of the tread is at a maximum when a tyre is new. This initial depth may vary depending on the type of tyre in question, and also on the use for which it is intended; by way of example, "winter" tyres generally have a tread pattern depth greater than that of "summer" tyres. When the tyre becomes worn, the depth of the elementary blocks of the tread pattern decreases and the stiffness of these elementary blocks increases. The increase in the stiffness of the elementary tread pattern blocks causes a reduction in some performance characteristics of the tyre, such as the grip on wet ground. The water discharge capacity also decreases markedly when the depth of the channels in the tread patterns decreases.

It is therefore desirable to be able to monitor the development of the wear of the tread of a tyre. The device of the invention is applicable to monitoring the wear of a tyre.

Other thicknesses of material for the tyre are accessible to measurement by the device of the invention. This is the case when measuring the thickness of rubbery material of a sidewall or of an inner rubber of a tyre.

Advantageously, if the measurement unit has an autonomous electrical power supply, such as a battery, the measurement unit is a portable unit.

Another subject of the invention is a method for manufacturing a measurement cell, comprising the following steps:

a. Machining the geometry of the measurement cell;

b. Positioning a sealing part in the measurement cell so as to leave a volume of air between the said sealing part and the bottoms of the measurement cell on the inside of the measurement surface;

c. Positioning an electronic measurement apparatus (electronic printed circuit board, ring magnets, Hall effect sensor) in the measurement cell by compressing them by way of a sealing part using a fastening guide;

d. Holding the electronic apparatus in its final position by way of a magnetized plate parallel to the measurement surface;

e. Injecting a resin into the measurement cell;

f. Closing the measurement cell by resin bonding so as to ensure it is sealed.

Another subject of the invention is a method for manufacturing a measurement unit. The electronic circuit, including the Hall effect sensor, and the magnetic circuit make it prohibitive to use metal components in the manufacture of the measurement unit. Metal components could disrupt the operation of the measurement apparatus. It should be easy to mount the components so as to obtain the measurement unit in the factory without generating excess cost over the existing way. As a substitute for metal components, plastics injection moulded parts could be used. For similar reasons, it is conceivable to resin bond the unit to ensure that it is sealed. Lastly, the manufacture of the measurement unit should be reproducible without using particular know-how to develop it, and the assembly of the parts should be done to standard tolerances. Such a method comprises the following steps:

a. Machining the geometry of the measurement unit;

b. Installing the measurement cells in the cavities of the measurement unit that are provided for this purpose;

c. Installing piezoelectric presence detection sensors at the edge of the measurement unit;

d. Establishing a connection to the public electricity grid using a transformer to deliver a DC electrical power supply to the measurement unit;

e. Installing a motherboard that groups together the electronic components necessary for the operation of the measurement unit;

f Installing a radio communication infrastructure (RFID reader, antennae, data reception/transmission);

g. Use of neodymium magnets to position the measurement cells in the unit before resin bonding;

h. Sealed closing of the measurement unit by resin bonding.

DESCRIPTION OF THE FIGURES

The appended figures illustrate the measuring device with specification of the link between the various components: the measurement cell, and the measurement unit. The illustration in this instance concerns the application of the said device to the measurement of the thickness of tyre treads.

DETAILED DESCRIPTION OF THE INVENTION

Figure 1:
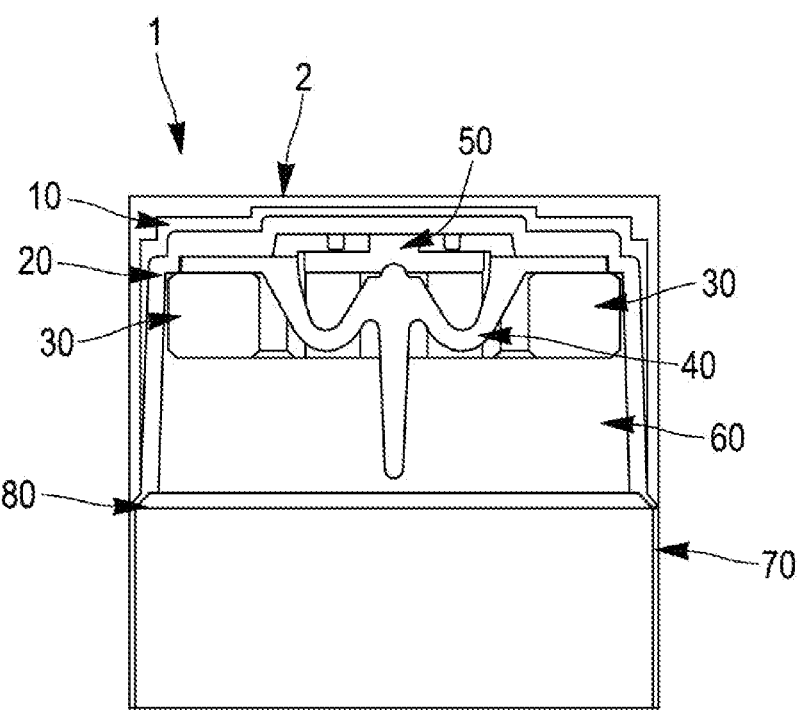
FIG. 1 is a perspective view of a measurement cell.

FIG. 1 shows a measurement cell which is the basic element of the measuring device of the invention. This measurement cell is identified by the overall reference 1 and is intended to measure, for example, the distance between two substantially parallel surfaces of an object, the said measurement cell comprising:

a measuring apparatus including a permanent static magnetic source 30, an electronic circuit 50 equipped with a Hall effect sensor, the output signal of which depends on the magnetic field generated;

a sealed cavity filled with a volume of air 10 is formed between the measuring apparatus and the measurement surface 2 of the measurement cell 1;

the sealed cavity is delimited by the inner surface of the cell, and by a sealing part 20, which has a profile that is homothetic to that of the measurement cell 1 in its upper section located below the measurement surface 2, and the said sealing part 20, in its lower section adjacent to the measurement surface, is equipped with an attachment system (80, 70) which is sealed in relation to the measurement cell 1;

a fastening guide 40 applies a force to hold the measuring apparatus against the sealing part 20 in its central portion closest to the measurement surface 2. The lower section of the sealing part 20 is embedded in the resin 60.

Figure 2:
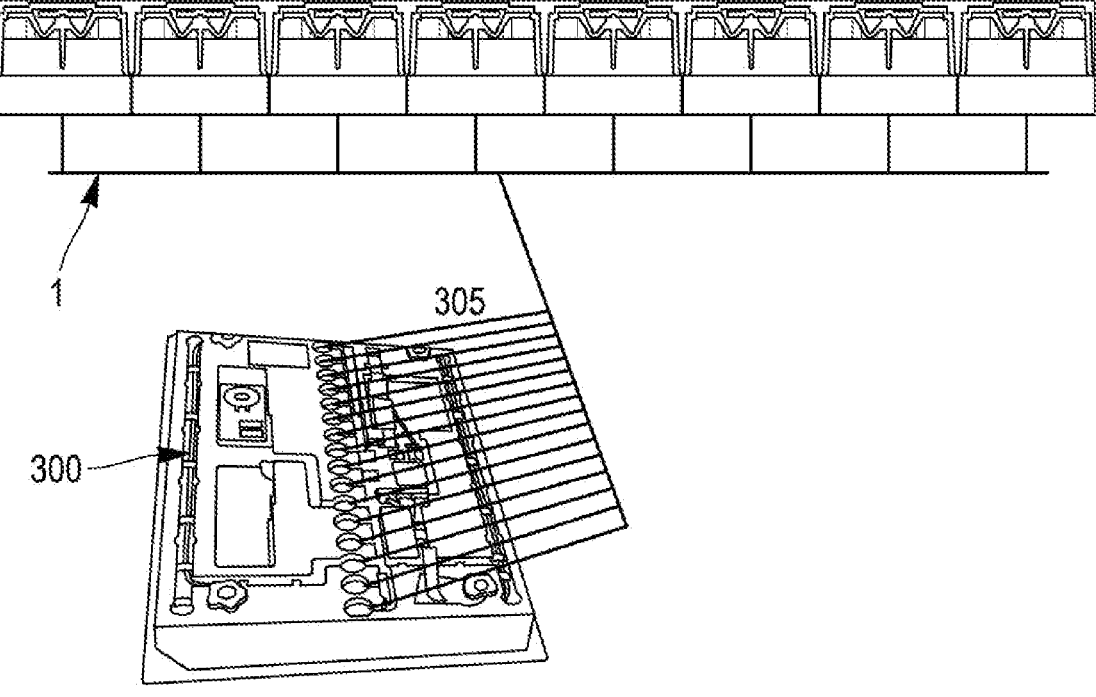
FIG. 2 shows a measurement unit with a plurality of measurement cells.

FIG. 2 shows a measurement unit 300 and a plurality of aligned measurement cells 1. The measurement cells 1 are intended to be accommodated in cavities 305 of the measurement unit 300 that are provided for this purpose, as indicated in FIG. 2. A row can contain up to 16 measurement cells 1. They are spaced apart at a constant distance of approximately 35 mm. In each of the cavities 305, the measurement cells 1 are able to measure the local magnetic field. This embodiment of the unit 300 makes it possible to measure the thickness of a layer of rubber for a tyre at multiple points, at the same time, along a line.

Figure 3:
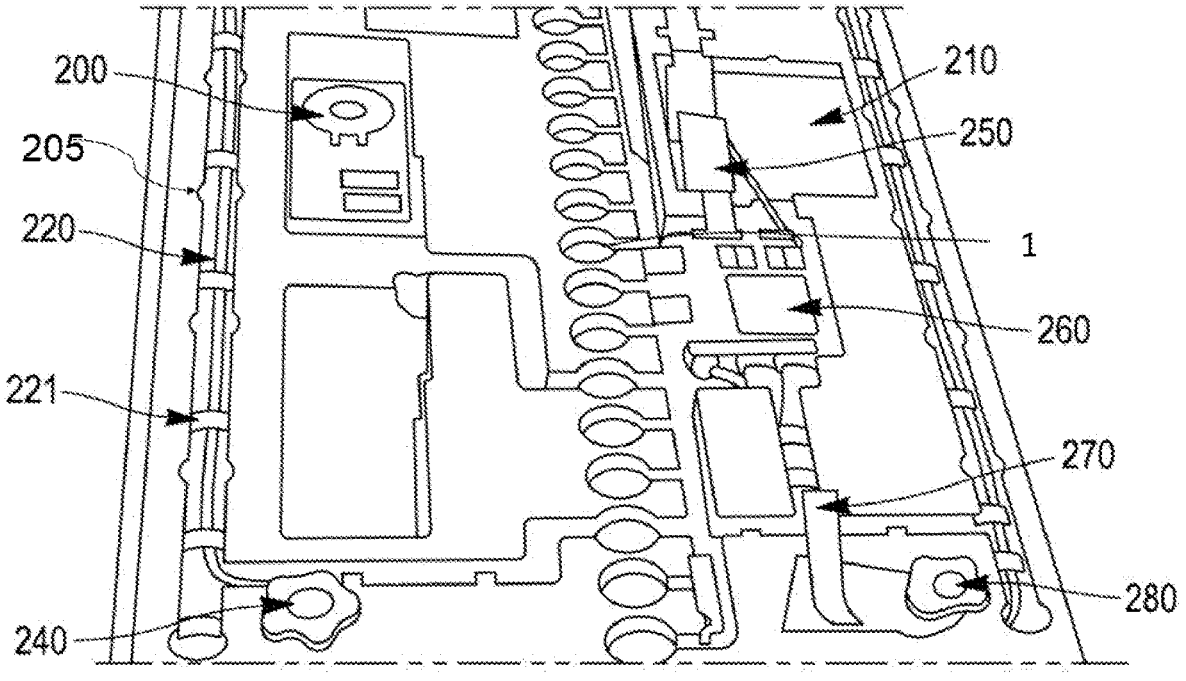
FIG. 3 is an enlarged view of the measurement unit.

FIG. 3 shows an enlarged view of the measurement unit 300 presented in FIG. 2. In this embodiment, the measurement unit 300 is intended to be embedded in the ground in order to take measurements on a tyre which is mounted on a vehicle and will be driven over the said unit 300, which comprises the following components:

Measurement cells 1 in the cavities of the measurement unit 300 provided for this purpose;

Piezoelectric sensors 205 on one of the edges of the measurement unit 300 for detecting the presence of a tyre to be measured. Once they are activated by the detection of the presence of a tyre, the measurement cells 1 are placed in a standby state. To strengthen the sealing of the measurement unit 300, butyl patches coat the piezoelectric sensors 205 in the form of a flat disc. The wires 220 of the piezoelectric sensors are fastened by a collar 221;

An electrical power supply system 200 connected to the public grid and provided with a transformer which makes it possible to deliver a DC electrical power supply to the measurement unit 300. The reference 270 represents the wiring of the measurement unit 300;

A motherboard 260 that groups together the electronic components necessary for the operation of the measurement unit 300. A device 250 fastens the motherboard to the unit. In particular, the motherboard comprises a microprocessor for sequencing the operating steps: activating the measurement cells 1, measuring by way of the Hall effect, activating and reading the RFID sensors, formatting the data, transmitting the data and returning to the standby state;

An antenna card 210 for communicating with the RFID sensors in the tyre, and for connecting to the internet network.

Management of the output by a remote connection device for the post-processing of the data;

Selector wheels 240 and 280 for the tile on the manufacturing plate.

Figure 4:
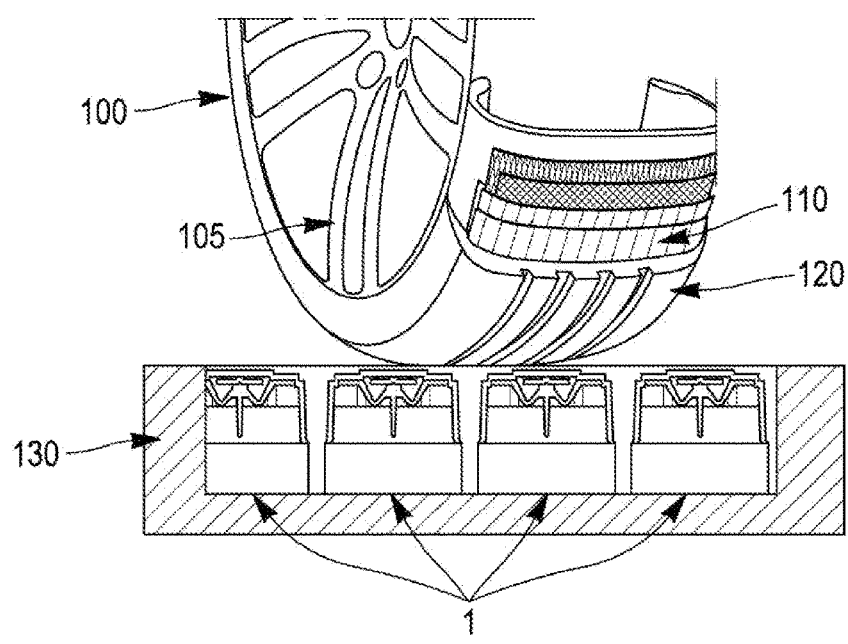
FIG. 4 shows an exemplary application of the invention for the measurement of the remaining thickness of a tread of a tyre.

FIG. 4 shows a basic diagram of the device for measuring the remaining thickness of the tread of a tyre. The tyre 100 is mounted on its rim 105. Radially on the inside of the tread 120 is positioned a crown ply 110 made up of mutually parallel metal reinforcers that form an angle with the circumferential direction of between 0° and 45° and are coated in an elastomeric compound. The tyre 100, which is compressed by the load of the vehicle, is driven over the measurement surface 2 of the measurement unit 300, which is embedded in a ground 130.

The measuring system is usable both for a heavy-duty vehicle and for a passenger vehicle. The remaining thickness of rubbery material of the tread is measured when the tyre 100 runs above the measurement unit 300, without it being necessary to stop the vehicle or dismount the tyre from the vehicle.

The crown ply 110 comprises ferromagnetic materials, which are the metal reinforcers described above. The crown ply 110 is therefore a good magnetic field conductor and a poor conductor of electricity; the field lines will of course attempt to pass through this metal reinforcement rather than through the air, because the reluctance of air is greater than that of the crown ply. A localization of the magnetic field lines through the crown ply 110 is observed.

The operating mode of the distance measuring device according to one subject of the invention uses this physical principle and is a reluctance mode, and so it is related to the magnetic permeability of the different parts of the magnetic circuit formed by the source and the object of which the distance is measured with the sensor.

Figure 5:
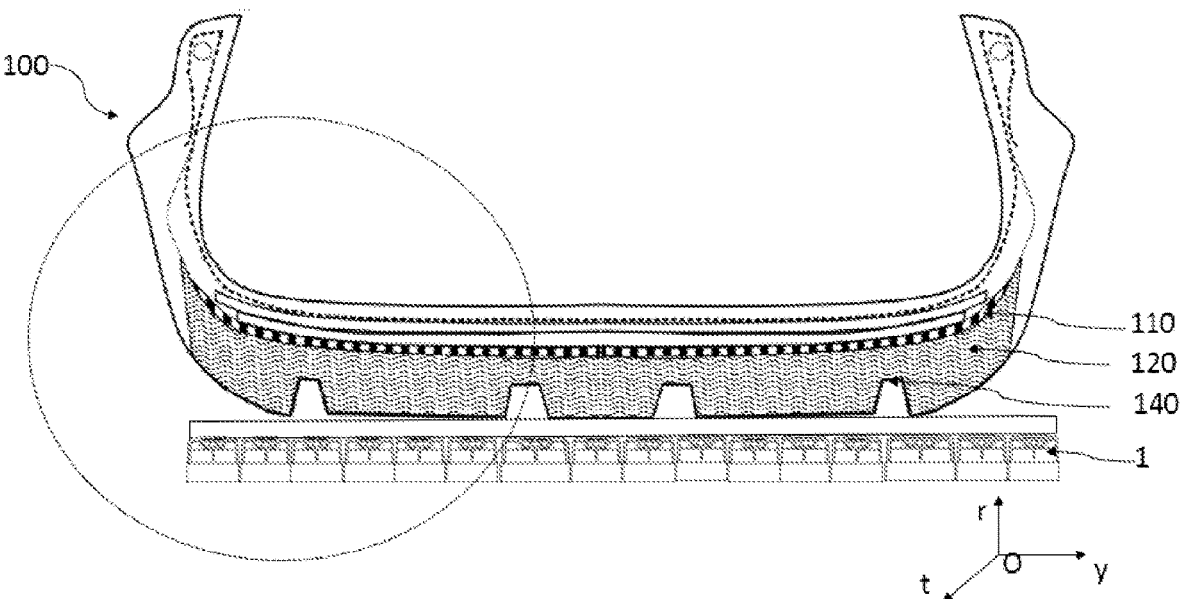
FIG. 5 shows a meridian of the tyre to be measured shown in a cylindrical frame of reference (O, r, y, t). The meridian plane is indicated by the radial (Or) and axial (Oy) directions. The circumferential direction (Ot) is orthogonal to the meridian plane (O, r, y)

FIG. 5 shows a meridian of the tyre to be measured in the contact patch, shown in a cylindrical frame of reference (O, r, y, t). The meridian plane is indicated by the radial (Or) and axial (Oy) directions. The circumferential direction (Ot) is orthogonal to the meridian plane (O, r, y); The tyre 100 comprises a tread 120 radially on the outside of a crown layer 110. The said tread also comprises grooves which delimit void bottoms 140. In the contact patch, meridians of the tyre are in contact with the measurement unit 300 containing the measurement cells 1.

Figure 6:
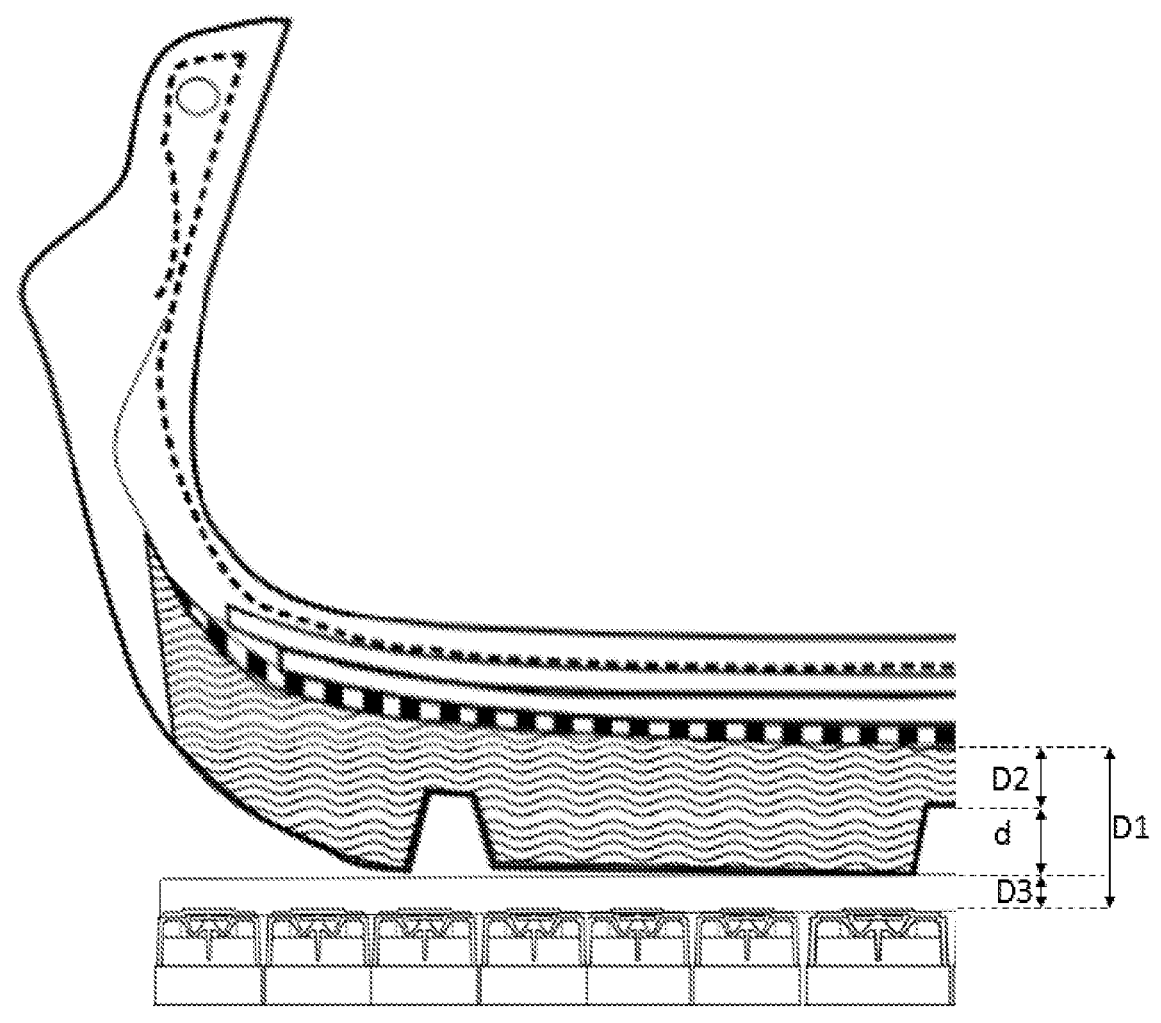
FIG. 6 is an enlarged view of the section circled by dashed line in FIG. 5. It makes it possible to show the link between the distances measured.

FIG. 6 shows an enlarged view of the area circled by dashed line in FIG. 5. It makes it possible to show the link between the distances measured.

Each measurement cell 1 measures the distance D1 which separates it from the crown ply 110 of the tyre 100. D1 has three components. Two of these components are fixed: the distance D2 which separates the bottom of the tread patterns from the crown ply 110, and the distance D3 which separates the measurement cell 1 from the application face of the unit 300. The distance "d" corresponding to the remaining thickness of the tread satisfies the following relationship:

$$d = D_1 - D_2 - D_3$$

The distance D2 can be known from the identification of the type of tyre measured. This identification may be manual or automatic, being performed, for example, by retrieving identification data recorded in a transponder such as an RFID device incorporated in the structure of the tyre.

The measurement unit 300 can be used to measure the remaining distance d over the entire width of the contact patch so as to establish the wear map of the tread 120.

Tests

Tests were carried out with a distance measuring device of the invention, that is to say with measurement cells provided with a volume of air formed between the measuring apparatus and the measurement surface of the cell, so as to mechanically isolate the measuring apparatus from the external stresses. The results of these tests were compared to those obtained with cells which do not comprise this isolating volume of air in the measuring apparatus.

The measuring apparatus of the measuring device of the invention were produced with two neodymium-iron-boron permanent magnets. Their geometry is defined by: outside diameter 26.75 mm, inside diameter 16 mm and height 5 mm for the first, and outside diameter 19.1 mm, inside diameter 9.5 mm and height 6.4 mm for the second. The Hall effect sensor used was made by Honeywell, reference SS39E.

Figure 7:
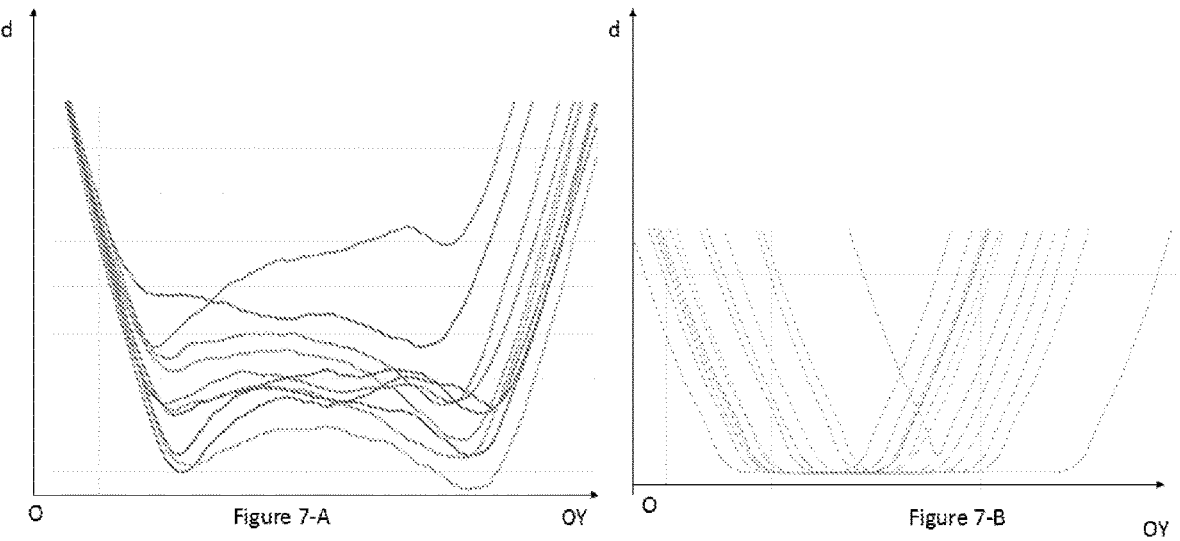
FIG. 7 shows the distance measurement results on a device of the prior art, FIG. 7-A, and on a device according to the invention, FIG. 7-B.

FIG. 7 shows the qualitative improvement in the measurement results obtained with the invention over the prior art. In the two graphs 7-A and 7-B, the distances measure the thickness of the tread from its outer surface to the first crown ply in the radial direction. The abscissa axes represent the axial position in the contact patch, and the ordinate axes represent the distance measured between the crown ply 110 and the sensors.

In graph 7-B, the measurements are neater, less blurry, and are more precise in relation to FIG. 7-A. This is a visualization of the qualitative improvement, although quantitatively, the results are also more robust with the device of the invention.

The invention claimed is:

1. A device for measuring a distance between two substantially parallel surfaces of an object, the device comprising a hermetic measurement cell having:

an outer part having a measurement surface and an inner surface, the measurement surface being configured to be a flat surface and configured to be in contact with the object to be measured;

a measuring apparatus including a permanent magnetic field source and an electronic circuit equipped with a Hall effect sensor, wherein an output signal of the Hall effect sensor depends on a magnetic field generated via the permanent magnetic field source; and a fastening guide that exerts a force to partially hold the measuring apparatus against a sealing part of the hermetic measurement cell in a central portion closest to the measurement surface, wherein a variation in the magnetic field is generated when the object is resting on the hermetic measurement cell, wherein the sealed cavity is delimited by the inner surface of the outer part of the hermetic measurement cell and an outward surface of the sealing part of the hermetic measurement cell such that the sealed cavity is outward of the sealing part of the hermetic measurement cell and inward of both the measurement surface and the inner surface of the outer part of the hermetic measurement cell, and wherein the sealing part of the hermetic measurement cell has a profile that is homothetic to that of the hermetic measurement cell in its upper section located below the measurement surface.

2. The device according to claim 1, wherein the lower section of the sealing part of the hermetic measurement cell is embedded in a resin.

3. The device according to claim 1, wherein the permanent magnetic field source has a current running therethrough and is made up of at least one coil supplied with a direct electric current for a creation of a magnetic field.

4. The device according to claim 1, wherein the permanent magnetic field source is made up of a plurality of permanent magnets disposed in a line.

5. The device according to claim 1, wherein the hermetic measurement cell is disposed inside a measurement unit which is not electrically conductive and which is composed of materials which have a magnetic susceptibility which is about zero or about a magnetic susceptibility of air.

6. The device according to claim 5 further comprising a plurality of aligned measurement cells installed in the measurement unit so as to interact to measure the distance between the two substantially parallel surfaces at multiple measurement points.

7. The device according to claim 5, wherein the measurement unit is disposed on or embedded in a ground over which a tire is driven.

8. The device according to claim 5, wherein the measurement unit is a portable unit.

* * * * *